United States Patent
Kim et al.

(10) Patent No.: US 10,353,656 B2
(45) Date of Patent: Jul. 16, 2019

(54) USER TERMINAL DEVICE AND METHOD FOR CONTROL THEREOF AND SYSTEM FOR PROVIDING CONTENTS

(71) Applicant: SAMSUNG ELECTRONICS CO., LTD., Suwon-si (KR)

(72) Inventors: Byuk-sun Kim, Seoul (KR); Sang-hoon Eum, Seoul (KR); Young-deok Kim, Anyang-si (KR); Hyun-kyu Yun, Seoul (KR); Myoung-jun Lee, Bucheon-si (KR); Byung-jo Jun, Seongnam-si (KR); Jae-won Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/680,354

(22) Filed: Aug. 18, 2017

(65) Prior Publication Data
US 2017/0344328 A1 Nov. 30, 2017

Related U.S. Application Data

(63) Continuation of application No. 14/922,878, filed on Oct. 26, 2015, now Pat. No. 9,766,849.

(30) Foreign Application Priority Data

Nov. 3, 2014 (KR) .................. 10-2014-0151001
Oct. 12, 2015 (KR) .................. 10-2015-0142195

(51) Int. Cl.
*G06F 3/14* (2006.01)
*G08C 17/02* (2006.01)
(Continued)

(52) U.S. Cl.
CPC .............. *G06F 3/14* (2013.01); *G06F 3/0346* (2013.01); *G06F 3/0416* (2013.01);
(Continued)

(58) Field of Classification Search
CPC ........ G06F 3/14; G06F 3/0346; G06F 3/0416; G06F 3/0488; G06F 3/04883;
(Continued)

(56) References Cited

U.S. PATENT DOCUMENTS 8,326,221 B2 12/2012 Dorsey
8,818,269 B2 8/2014 Dorsey
(Continued)

FOREIGN PATENT DOCUMENTS

CN 102754449 A 10/2012
CN 102884499 A 1/2013
(Continued)

OTHER PUBLICATIONS

Communication dated Mar. 29, 2018, issued by the State Intellectual Property Office of P.R. China in counterpart Chinese Patent Application No. 201510736854.0.
(Continued)

*Primary Examiner* — Tom V Sheng
(74) *Attorney, Agent, or Firm* — Sughrue Mion, PLLC

(57) ABSTRACT

A user terminal device, a method for controlling the user terminal device, and a system for providing content are disclosed. The user terminal device may include a communicator configured to communicate with a display device, a detector configured to detect a distance between the user terminal device and the display device, a plurality of inputters configured to receive input of a user command, and a controller. The controller is configured to activate at least one of the plurality of inputters in response to a detection that the user terminal is within a predetermined distance
(Continued)

with respect to the display device. The user terminal device may control an operation of the display device according to the distance between the user terminal device and the display device.

18 Claims, 12 Drawing Sheets

(51) Int. Cl.
　　　H04M 1/725　　　(2006.01)
　　　H04N 5/44　　　　(2011.01)
　　　H04N 21/41　　　(2011.01)
　　　H04N 21/422　　　(2011.01)
　　　G06F 3/041　　　(2006.01)
　　　G06F 3/0488　　　(2013.01)
　　　G06F 3/0346　　　(2013.01)
　　　H04N 21/414　　　(2011.01)
　　　H04N 21/4223　　(2011.01)
　　　H04N 21/443　　　(2011.01)
(52) U.S. Cl.
　　　CPC ......... *G06F 3/04883* (2013.01); *G08C 17/02* (2013.01); *H04M 1/72533* (2013.01); *H04N 5/4403* (2013.01); *H04N 21/4122* (2013.01); *H04N 21/4126* (2013.01); *H04N 21/41407* (2013.01); *H04N 21/4223* (2013.01); *H04N 21/42202* (2013.01); *H04N 21/42204* (2013.01); *H04N 21/42207* (2013.01); *H04N 21/42208* (2013.01); *H04N 21/42224* (2013.01); *H04N 21/4436* (2013.01); *G06F 2203/0383* (2013.01); *G06F 2203/04101* (2013.01); *G08C 2201/91* (2013.01); *G08C 2201/93* (2013.01); *H04M 2250/22* (2013.01); *H04N 2005/443* (2013.01); *H04N 2005/4405* (2013.01); *H04N 2005/4408* (2013.01); *H04N 2005/4425* (2013.01); *H04N 2005/4428* (2013.01); *H04N 2005/4433* (2013.01)
(58) Field of Classification Search
　　　CPC ... G06F 2203/0383; G06F 2203/04101; G08C 17/02; G08C 2201/91; G08C 2201/93; H04M 1/72533; H04M 2250/22; H04N 5/4403; H04N 21/00; H04N 21/4122; H04N 21/4126; H04N 21/41407; H04N 21/42202; H04N 21/42203; H04N 21/42204; H04N 21/42207; H04N 21/42208; H04N 21/42224; H04N 21/4223; H04N 21/4436; H04N 2005/4405; H04N 2005/4408; H04N 2005/4425; H04N 2005/4428; H04N 2005/443; H04N 2005/4433
　　　See application file for complete search history.

(56) References Cited

U.S. PATENT DOCUMENTS

| | | | |
|---|---|---|---|
| 8,913,026 B2 | 12/2014 | Yoo | |
| 8,965,314 B2 | 2/2015 | Jeong | |
| 9,766,849 B2* | 9/2017 | Kim | ................. G06F 3/14 |
| 9,990,062 B2 | 6/2018 | Nurmi | |
| 2007/0259690 A1* | 11/2007 | Julian | ................. H04L 67/24 |
| | | | 455/557 |
| 2008/0174551 A1* | 7/2008 | Ishibashi | .............. H04N 5/4403 |
| | | | 345/158 |
| 2010/0203833 A1 | 8/2010 | Dorsey | |
| 2010/0253623 A1* | 10/2010 | Wei | ................. G06F 3/0346 |
| | | | 345/158 |
| 2011/0046755 A1* | 2/2011 | Sung | ................ H04N 21/43615 |
| | | | 700/90 |
| 2011/0148926 A1 | 6/2011 | Koo et al. | |
| 2011/0234491 A1 | 9/2011 | Nurmi | |
| 2012/0050180 A1 | 3/2012 | King et al. | |
| 2013/0044051 A1 | 2/2013 | Jeong | |
| 2013/0095762 A1 | 4/2013 | Inagaki et al. | |
| 2013/0100013 A1 | 4/2013 | Lee | |
| 2013/0173315 A1 | 7/2013 | Dorsey | |
| 2013/0234959 A1 | 9/2013 | Yoo | |
| 2013/0234983 A1 | 9/2013 | Yoo | |
| 2013/0234984 A1 | 9/2013 | Yoo | |
| 2013/0241854 A1 | 9/2013 | Yoo | |
| 2013/0244730 A1 | 9/2013 | Yoo | |
| 2013/0262616 A1 | 10/2013 | Kim et al. | |
| 2014/0008496 A1 | 1/2014 | Ye et al. | |
| 2014/0049495 A1 | 2/2014 | Westerman | |
| 2014/0053079 A1 | 2/2014 | Ollila et al. | |
| 2014/0080416 A1* | 3/2014 | Seo | ................. H04M 1/7253 |
| | | | 455/41.2 |
| 2014/0085201 A1* | 3/2014 | Carmel-Veilleux | ........................ |
| | | | G06F 1/1694 |
| | | | 345/158 |
| 2014/0125622 A1 | 5/2014 | Yoo | |
| 2015/0082216 A1* | 3/2015 | Dai | .................... G06F 3/04886 |
| | | | 715/767 |
| 2015/0256875 A1* | 9/2015 | Park | ................. H04N 21/42222 |
| | | | 725/44 |
| 2016/0054847 A1* | 2/2016 | Sugimoto | ................ G09G 3/36 |
| | | | 345/173 |

FOREIGN PATENT DOCUMENTS

| | | |
|---|---|---|
| CN | 102957956 A | 3/2013 |
| CN | 103369144 A | 10/2013 |
| CN | 203465840 U | 3/2014 |
| EP | 2582146 A1 | 7/2013 |
| JP | 2012-186602 A | 9/2012 |
| KR | 10-2013-0017339 A | 2/2013 |
| KR | 10-2013-0043870 A | 4/2013 |
| KR | 10-2013-0075771 A | 7/2013 |
| KR | 10-2013-0103363 A | 9/2013 |
| KR | 10-2013-0107555 A | 10/2013 |
| KR | 10-2013-0112316 A | 10/2013 |
| KR | 10-1362770 B1 | 2/2014 |
| KR | 10-2014-0034100 A | 3/2014 |
| KR | 10-2014-0122284 A | 10/2014 |
| WO | 2007/121414 A2 | 10/2007 |

OTHER PUBLICATIONS

Communication dated Jan. 13, 2016, issued by the European Patent Office in counterpart European Patent Application No. 15192691.2.
Search Report dated Feb. 17, 2016, issued by the International Searching Authority in counterpart International Patent Application No. PCT/KR2015/010919 (PCT/ISA/210).
Written Opinion dated Feb. 17, 2016, issued by the International Searching Authority in counterpart International Patent Application No. PCT/KR2015/010919 (PCT/ISA/237).
Office Action issued in parent U.S. Appl. No. 14/922,878 dated Dec. 23, 2016.
Notice of Allowance issued in parent Application No. 14/922,878 dated May 17, 2017.
Communication dated Mar. 6, 2019 issued by the State Intellectual Property Office of P.R. China in counterpart Chinese Application No. 201510736854.0.

* cited by examiner

FIG. 6
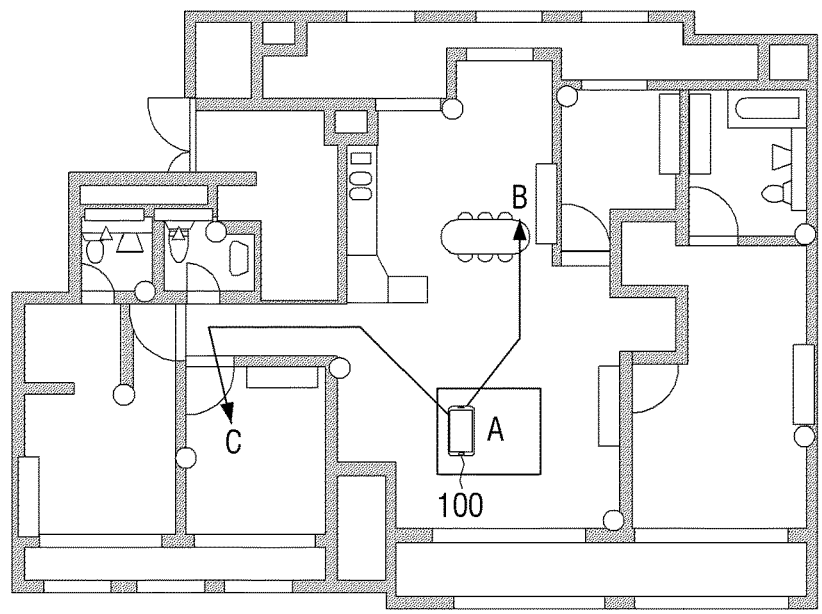
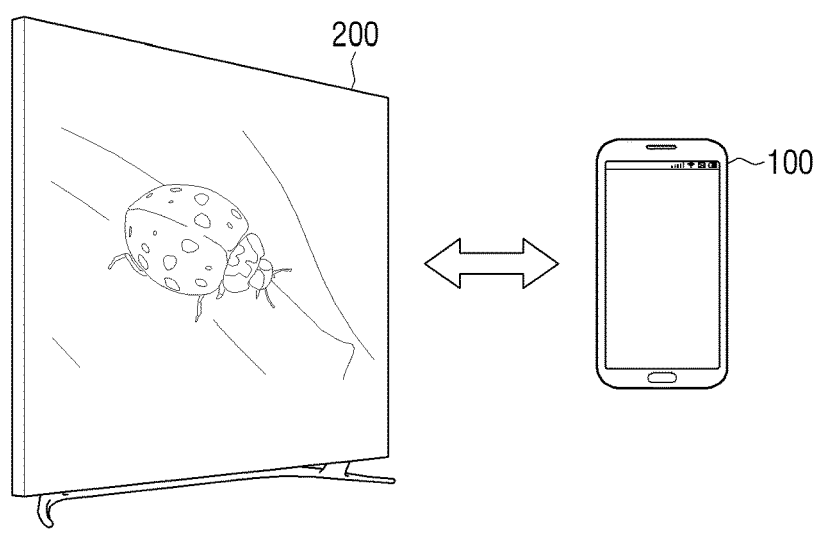

USER TERMINAL DEVICE AND METHOD
FOR CONTROL THEREOF AND SYSTEM
FOR PROVIDING CONTENTS

CROSS-REFERENCE TO RELATED
APPLICATION

This application is a continuation of U.S. application Ser. No. 14/922,878 filed on Oct. 26, 2015, which claims priority from Korean Patent Application No. 10-2014-0151001, filed on Nov. 3, 2014 and Korean Patent Application No. 10-2015-0142195 filed on Oct. 12, 2015, in the Korean Intellectual Property Office, the disclosures of which are incorporated herein by reference in their entirety.

BACKGROUND

1. Field

Methods and apparatuses consistent with exemplary embodiments relate to a user terminal device, a method for control thereof and a system for providing content, and more particularly, to a user terminal device capable of controlling a display device, a method for providing, and a system for providing content.

2. Description of the Related Art

Thanks to the continuing development of communication and electronic apparatuses, display devices and user terminal devices can interact and provide a user with information, displayed on a display device under the control of a user terminal device. Additionally, a user may use a user terminal device as a remote control capable of controlling a display device.

For example, a particular application, related to a remote control device may be utilized to enable a user terminal device to control an operation of a display device using a user interface (UI) associated with the corresponding application.

However, users want to be able to access various other interactive experiences and to multitask while using the remote control function. Accordingly, a method for controlling an operation of a display device more intuitively and conveniently through a user terminal device, based on a location and condition of a user, is needed.

SUMMARY

One or more exemplary embodiments may provide a user terminal device capable of providing various functions according to a touch interaction between a user and at least one of a display unit and a bezel unit, and a method thereof.

According to an aspect of an exemplary embodiment, a user terminal device may include a communicator configured to communicate with a display device, a detector configured to detect a distance to the display device, a plurality of inputters configured to receive an input of a user command, and a controller configured to, if it is detected that the user terminal device exists within a predetermined distance with respect to the display device through the detector, activate at least one of a plurality of inputters.

The plurality of inputters may include a touch inputter and a proximity inputter, and the controller, if it is detected that the user terminal device is within the predetermined distance with respect to the display device, may activate both the touch inputter and the proximity inputter.

The controller, if the proximity inputter is activated, may control the proximity inputter to expand a finger hovering area.

The user terminal device may further include a motion detector configured to detect a motion of the user terminal device, and the controller, if a gradient value detected by the motion detector is not less than a predetermined threshold value, may control the proximity inputter to return the expanded finger hovering area to a predetermined finger hovering area.

The controller, while the touch inputter and the proximity inputter are activated, if it is detected that the user terminal device is not within the predetermined distance with respect to the display device, may deactivate the proximity inputter.

The controller, if it is detected that the user terminal device is not within the predetermined distance with respect to the display device, may transmit a first mode control signal, for entering the display device into a power saving mode, to the display device through the communicator, and while the display device is in the power saving mode, if it is detected that the user terminal device is within the predetermined distance with respect to the display device, may transmit a second mode control signal, for activating the display device, to the display device.

The user terminal device may further include a display, and the controller, if it is detected that the user terminal device is within the predetermined distance with respect to the display device, may control the display to display a user interface (UI) for controlling an operation of the display device, and if it is detected that the user terminal device is not within the predetermined distance with respect to the display device, may control the display to display a content and a UI related to the content.

The controller, if it is detected that the user terminal device is not within the predetermined distance with respect to the display device, may control the display to display the content and the UI related to the content through the display, based on content information received from the display device.

The detector may be at least one of a Bluetooth low energy (BLE) sensor and an ultrasonic wave sensor.

According to an aspect of another exemplary embodiment, a method for controlling a user terminal device may include communicating with a display device, detecting a distance to the display device, determining whether the user terminal device s within a predetermined distance with respect to the display device, and, if the user terminal device is within the predetermined distance with respect to the display device, activating at least one of a plurality of inputters.

The plurality of inputters may include a touch inputter and a proximity inputter, and the activating at least one of a plurality of inputters may include, if it is detected that the user terminal device is within a predetermined distance with respect to the display device, activating both the touch inputter and the proximity inputter.

The method may further include, upon activation of the proximity inputter, expanding a finger hovering area of the proximity inputter.

the method may further include, if a gradient value detected through a motion detector is not less than a predetermined threshold value, returning the expanded finger hovering area to a predetermined finger hovering area.

The method may further include, if the touch inputter and the proximity inputter are activated, if it is detected that the user terminal device is not within the predetermined distance with respect to the display device, deactivating the proximity inputter.

The activating the at least one of a plurality of inputters may include, if it is detected that the user terminal device is not within the predetermined distance with respect to the display device, transmitting a first mode control signal, for entering the display device into a power saving mode, to the display device, and while the display device is in the power saving mode, if it is detected that the user terminal device is within the predetermined distance with respect to the display device, transmitting a second mode control signal, for activating the display device, to the display device.

The activating the display device may include, if it is detected that the user terminal device is within the predetermined distance with respect to the display device, displaying, on a touch screen of the user terminal device, a UI for controlling an operation of the display device, and if it is detected that the user terminal device is not within the predetermined distance with respect to the display device, displaying, on the touch screen, a content and a UI related to the content.

The activating the display device may include, if the user terminal device is not within the predetermined distance with respect to the display device, displaying on the touch screen of the user terminal device, the content and a UI related to the content.

The detecting may include detecting the distance to the display device using at least one of a BLE sensor and an ultrasonic sensor.

According to an aspect of another exemplary embodiment, a content providing system may include a display device configured to display content, and a user terminal device configured to activate at least one of a plurality of inputters and to control an operation of the display device through the activated inputter, based on a distance between the user terminal device and the display device.

At least one of the user terminal device and the display device may further include a detector including at least one of a BLE sensor and an ultrasonic sensor.

The user terminal device, if it is detected that the user terminal device is within the predetermined distance with respect to the display device through distance information detected by the sensor or distance information received from the display device, may activate a touch inputter and a proximity inputter, and if the user terminal device is not within a predetermined distance with respect to the display device, may deactivate the activated proximity inputter, and if the proximity inputter is activated, may expand a finger hovering area of the proximity inputter.

The user terminal device, if the user terminal device is within the predetermined distance with respect to the display device, may provide a UI for controlling an operation of the display device, and if the user terminal device is not within the predetermined distance with respect to the display device, may transmit a first mode control signal, for entering the display device into a power saving mode, to the display device.

The display device, if the first mode control signal is received, may transmit content information, regarding a content which is currently displayed, to the user terminal device and may then enter the power saving mode, and the user terminal device may display the content and a UI related to the content based on a receipt of the content information.

The display device, in response to an event signal generated according to a preset event being received from the user terminal device, may transmit a brightness control signal to the user terminal device based on a sensing value sensed from an illuminance sensor which senses surround brightness, wherein the user terminal device may control light emission of a rear backlit included in a housing of the user terminal device according to the brightness control signal received from the display device, and wherein the preset event may be at least one of an event that a user command is input from the activated inputter and an event that a motion of the user terminal device is detected.

The controller, in response to a preset event being generated, may control the communicator to transmit an event signal to the display device, wherein the controller, in response to a brightness control signal being received from the display device through the communicator, may control light emission of a rear backlit included in a housing of the user terminal device, and wherein the preset event may be at least one of an event that a user command is input from the activated inputter and an event that a motion of the user terminal device is detected.

The communicating may include, in response to a preset event being generated, transmitting an event signal to the display device, wherein the activating in an active mode comprises, in response to the brightness control signal being received from the display device, activating the rear backlit included in an housing of the user terminal device to emit light, and wherein the preset event may be at least one of an event that a user command is input from the activated inputter and an event that a motion of the user terminal device is detected.

Accordingly, one or more exemplary embodiments, may provide a user terminal device having function of controlling an operation of the display device according to a distance to the display device more intuitively and quickly.

BRIEF DESCRIPTION OF THE DRAWINGS

FIG. 6 is a drawing illustrating performing different operations according to a distance between a user terminal device and a display device, according to an exemplary embodiment;

DETAILED DESCRIPTION OF THE EXEMPLARY EMBODIMENTS

Hereinafter, exemplary embodiments will be described in greater detail with reference to the accompanying drawings.

Figure 1:
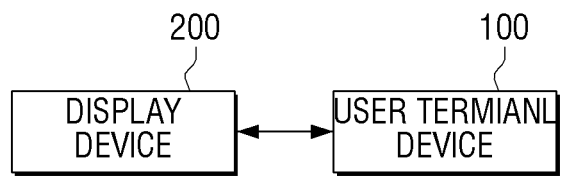
FIG. 1 is a block diagram illustrating a configuration of a content providing system according to an exemplary embodiment.
Figure 2:
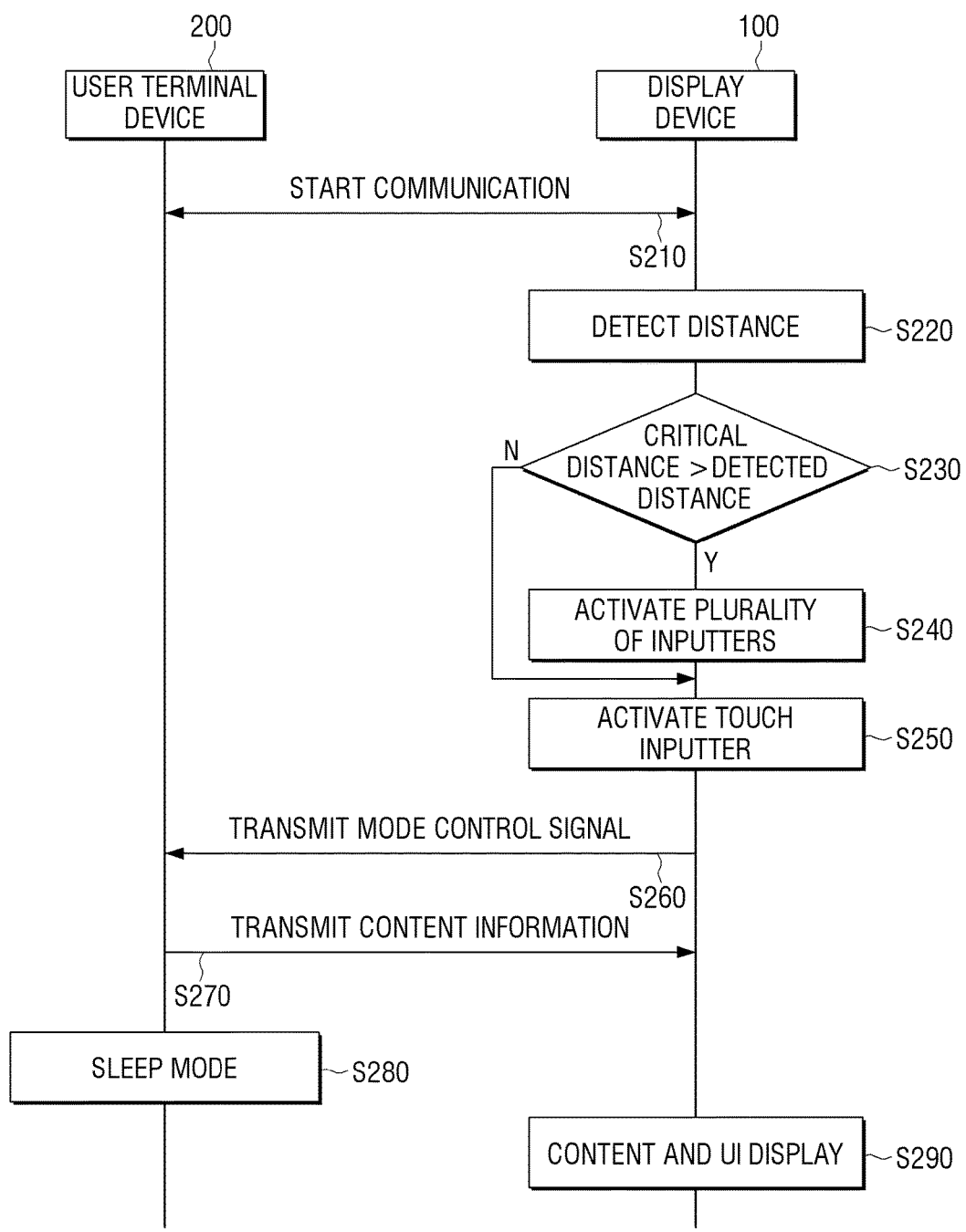
FIG. 2 is a flowchart illustrating a content providing system according to an exemplary embodiment.

FIG. 1 is a block diagram illustrating a configuration of a content providing system according to an exemplary embodiment. FIG. 2 is a flowchart illustrating a content providing system which provides a content service according to an exemplary embodiment.

As illustrated in FIG. 1, a content providing system includes at least one user terminal device 100 and a display device 200. Herein, the display device 200 is a terminal device such as a smart television (TV) or a digital TV, and may be any type of device which is capable of displaying content. A user terminal device 100 is a mobile terminal device such as a smart phone or a tablet personal computer (PC), and may be any type of device which is capable of displaying images and/or text.

However, the present disclosure is not limited thereto, and the user terminal device 100 may be a remote control device such as a remote controller which controls operations of the display device 200.

To be specific, as illustrated in FIG. 2, if data communication between a user terminal device 100 and a display device 200 is started, the user terminal device 100 periodically detects a distance to the display device 200 (S210, S220).

According to an exemplary embodiment, the user terminal device 100 may request a response message from a plurality of terminal devices including the display device 200 which is connected to the same network as the user terminal device, via a broadcasting method. At least one terminal device, among a plurality of terminal devices which receive the response message, may transmit a response message to the user terminal device 100. Accordingly, the user terminal device 100 may search among a plurality of terminal devices which are connected to the network of the user terminal device 100, based on one or more received response messages, and may display, on a screen of the user terminal device 100, a list comprising the one or more terminal device which are connected to the network. If a selection command is inputted into the user terminal device 100 by a user while the list is being displayed, the user terminal device 100 may perform a pairing with the display device 200 which corresponds to the inputted selection command and may start communication with the display device 200.

After communication with the display device 200 is started, the user terminal device 100 may detect a distance between the user terminal device 100 and the display device 200, with which the user terminal device is communicating, via a detecting sensor such as a Bluetooth low energy (BLE) sensor.

If the distance between the user terminal device 100 and the display device 200 is detected by the detecting sensor, the user terminal device 100 compares the detected distance and a predetermined threshold distance, and determines whether the user terminal device 100 is within the predetermined threshold distance with respect to the display device 200 (S230).

As a result of the determination, if it is determined that the user terminal device 100 is within the predetermined distance with respect to the display device 200, the user terminal device 100 activates a plurality of inputters (S240). The plurality of inputters are configured to enable a user to input a control command for controlling an operation of the display device 200, and the plurality of inputters may include a touch inputter, which is a touch sensor, and a proximity inputter, which is a proximity sensor, according to an exemplary embodiment. The touch inputter is configured t, detect a touch of a user on a touch screen and to transmit an associated command, regarding a control user input (UI) for controlling an operation of the display device 200, to the display device 200. The proximity inputter is configured to detect whether a user's finger, or another input element as would be understood by one of skill in the art, is close to the user terminal device 100 and to transmit an associated control command, related to an operation of the display device 200, to the display device 200. However, the present invention is not limited hereto, and the user terminal device 100 may control an operation of the display device 200 through an inputter such as a motion detecting sensor, a camera or the like. Accordingly, the user terminal device 100 may activate any inputter capable of controlling an operation of the display device 200, including a touch inputter and a proximity inputter.

Accordingly, a user, who is watching content of a channel that the user previously requested using the display device 200, may change the displayed channel through any of various inputters, such as a touch inputter, of the user terminal device 100 100 and a proximity inputter, and may control a volume of a content that the user is watching.

Meanwhile, as described above, the user terminal device 100 periodically detects a distance to the display device 200 using an equipped detecting sensor, compares detected distance information and predetermined threshold distance information and determines whether the user terminal device 100 is within the predetermined threshold distance with respect to the display device 200. Accordingly, while a plurality of inputters are activated, if it is determined that the user terminal device 100 exists outside of the predetermined threshold distance with respect to the display device, the user terminal device 100 deactivates the remaining activated inputters, except for a touch inputter, from among a plurality of activated inputters (S250).

Then, the user terminal device 100 transmits a mode control signal to the display device 200 (S260). If the mode control signal is received, the display device 200 transmits content which is currently being displayed on the display device 200 and content information regarding the content to the user terminal device 100 (S270). Then, the display device 200 converts a mode into a power saving mode according to a received mode control signal (S280). If content information is received from the display device 200, the user terminal device 100 displays on its own display, the content which is being displayed on the display device 200 and, additionally, a UI for controlling the content based on received content information (S290).

For example, a living room in which a smart TV, which is the display device 200, is located may be set to a predetermined area predetermined with respect to a smart phone which is the user terminal device 100. Accordingly, a user who is watching a drama through the display device 200 may directly touch a control UI displayed on the touch screen of the user terminal device 100 located next to the user, and may thereby perform an operation of changing a channel of the display device 200 or controlling a volume thereof. In addition, a user may perform an operation of changing a channel of the display device 200 and controlling the volume with a touch motion, but without directly touching the touch screen of the user terminal device 100.

As described above, when the user terminal device 100 is a remote controller, the user terminal device 100, in response to a present event being generated, transmits an event signal to the display device 200. Herein, the preset event may be at least one of an event that a user command is input from the activated inputter and an event that a motion of the user terminal device 100 is detected.

When the event signal is received, the display device 200 senses surround brightness through an illuminance sensor provided on the display device 200, and when the sensed brightness information is less than or equal to preset threshold, transmits the brightness control signal to the user terminal device 100.

However, the present disclosure is not limited thereto, and the display device 200, in response to a control signal received to control operations of the display device 200 from the user terminal device 100, senses surround brightness through an illuminance sensor provided on the display device 200 and transmits the brightness control signal to the user terminal device 100, when the sensed brightness information is less than or equal to a preset threshold value.

If the brightness control signal is received, the user terminal device 100 controls a rear backlit (not illustrated) included in a housing of the user terminal device 100 according to a brightness control signal received from the user terminal device 200. In this case, the user terminal device 100 may control the rear backlit so that light can be emitted for preset threshold time.

Light emitted through the rear backlit is emitted using a key button formed on the user terminal device 100. Therefore, a user can manipulate the user terminal device 100 even in a dark indoor place.

A system for providing a content according to an exemplary embodiment is explained above. Hereinafter, the user terminal device 100 and the display device 200 will be explained in detail.

Figure 3:
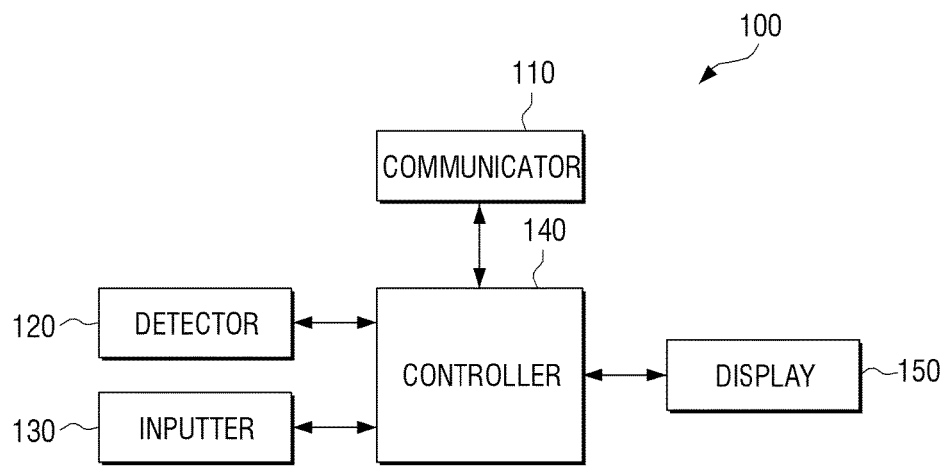
FIG. 3 is a block diagram illustrating a user terminal device according to an exemplary embodiment.
Figure 4:
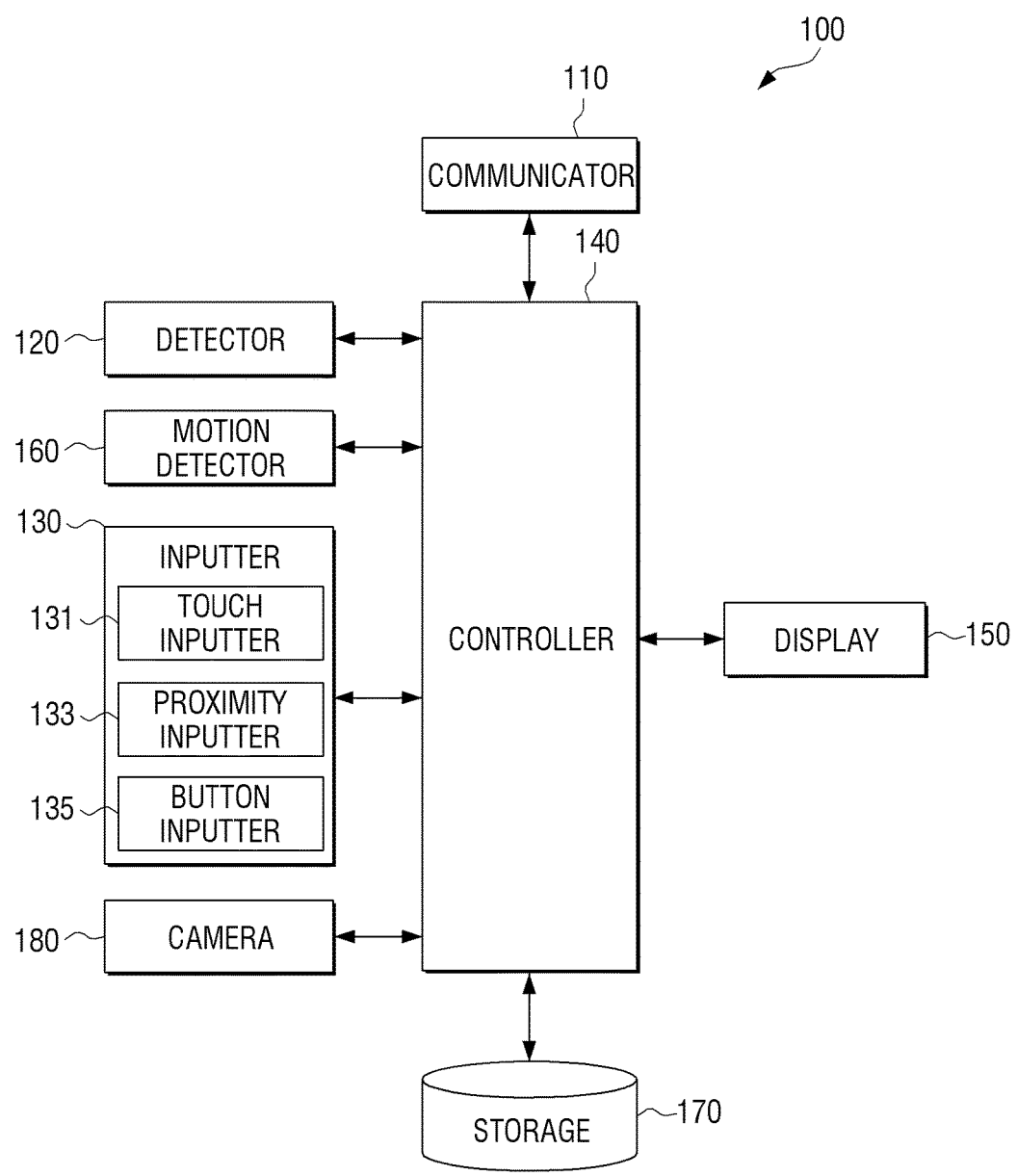
FIG. 4 is a block diagram illustrating a user terminal device in detail according to an exemplary embodiment.

FIG. 3 is a block diagram illustrating a user terminal device according to an exemplary embodiment, and FIG. 4 is a block diagram illustrating a user terminal device according to an exemplary embodiment.

As illustrated in FIG. 3, the user terminal device 100 includes a communicator 110, a detector 120, an inputter 130, a controller 140 and a display 150.

The communicator 110 performs a data communication wirelessly with the display device 200 which displays the content. In addition, the communicator 110 performs a data communication wirelessly with a peripheral terminal device which is connected to the same network as the user terminal device 100.

The communicator 110 may include any of various communication modules such as a short-distance wireless communication module (not illustrated), a wireless communication module (not illustrated) and the like. Herein, the short-distance wireless communication module performs a short-distance communication wirelessly with the display device 200 and a peripheral terminal device, and may be realized as at least one among a Bluetooth module, an infrared data association (IrDA) module, a near field communication (NFC) module, a Wi-Fi module and a Zigbee module. A wireless communication module is a module which performs a communication by connecting an external network according to a wireless communication protocol such as Wi-Fi, IEEE and the like. Other wireless communication modules may further include a mobile communication module which is connected to a mobile communication network and performs a communication according to various mobile communication standards such as the 3rd generation (3G), the 3rd generation partnership project (3GPP), the long term evolution (LTE) and the like.

The detector 120 detects a distance between the user terminal device 100 and the display device 200. It is desirable that the detector 120 periodically detect the distance between the user terminal device 100 and the display device 200. According to an exemplary embodiment, the detector 120 may detect the distance between the user terminal device 100 and the display device 200 using at least one detecting sensor among an ultrasonic wave sensor, a BLE sensor, and ultrasonic waves. thereby, the detector and detects a distance, a thickness, a movement and the like. However, exemplary embodiments are not limited hereto, and any configuration which is capable of detecting or measuring a distance between the user terminal device 100 and the display device 200 may be used in the embodiments described herein.

The inputter 130 receives a user command and inputs it to the controller 140. To be specific, the inputter 130 may receive a control command for controlling an operation of the display device 200 and a user command for controlling an operation of the user terminal device 100. The inputter 130 may be a plurality of inputters 130. Referring to FIG. 4, a plurality of inputters 130 may include a touch inputter 131, a proximity inputter 133 and button inputter, according to an exemplary embodiment. The touch inputter 131 may be a touch sensor which receives a touch command of a user on a touch screen, and the proximity inputter 133 may be a proximity sensor which receives a user command corresponding to the detection of a gesture of a user who is nearby. In addition, a button inputter 135 may be a key pad including function keys, number keys, special keys, and character keys.

The controller 140 controls an overall configuration of the user terminal device 100. If it is detected by the detector 120 that the user terminal device 100 is within the predetermined distance with respect to the display device 200, the controller 140 controls at least one of the plurality of inputters 130 to be activated. As described above, the plurality of inputters 130 may include a touch inputter 131 and a proximity inputter 133. Accordingly, if it is detected that the user terminal device 100 is within the predetermined distance with respect to the display device 200, the controller 140 controls the touch inputter 131 and the proximity inputter 133 to enter an activation mode. According to the control command, the touch inputter 131 and the proximity inputter 133 for controlling an operation of the display device 200 enter an activation mode.

However, exemplary embodiments are not limited hereto, and the display device 200 may detect the distance between the display device 200 and the user terminal device 100 by using a detector such as a BLE sensor and/or an ultrasonic wave sensor. An ultrasonic wave sensor uses ultrasonic waves and detects a distance, a thickness and a movement. The distance information detected by the detector may be transmitted to the user terminal device 100. In this case, the controller 140 may determine whether the distance between the user terminal device 100 and the display device 200 is within the predetermined distance based on the distance information received from the display device 200 via the communicator 110. As a result of the determination, if the distance between the user terminal device 100 and the display device 200 is within the predetermined distance, the controller 140 may control the touch inputter 131 and the proximity inputter 133 to enter the activation mode.

The controller 140 may analyze an image photographed through the camera 180, and according to whether an object corresponding to the display device 200 is included in the image, may determine whether the user terminal device 100 is within the predetermined distance with respect to the display device 200. If it is determined that an object corresponding to the display device 200 is included in the image, the controller 140 may determine that the user terminal device 100 is within the predetermined distance with respect to the display device 200, and will control the touch inputter 131 and the proximity inputter 133 to enter an activation mode. According to the control command, the touch inputter 131 and the proximity inputter 133 for controlling an operation of the display device 200 may enter an activation mode.

If the proximity inputter 133 is activated, the controller 140 controls the proximity inputter 133 to expand a finger hovering area within which a gesture of a user who is nearby can be detected. According to a control command, the proximity inputter 133 may expand the finger hovering area to a predetermined threshold area.

According to an additional aspect, referring to FIG. 4, the user terminal device 100 may further include a motion detector 160 which detects a motion of the user terminal device 100. According to an exemplary embodiment, the motion detector 160 may be a 6-axis sensor which uses an acceleration sensor, which recognizes a spatial movement, and a geomagnetic sensor which detects a directivity of a movement. The motion detector 160 which is the 6-axis sensor detects a motion of the user terminal device 100 according to an operation of a user and generates motion detection information corresponding thereto.

While a finger hovering area of the activated proximity inputter 133 is extended, if motion detection information is generated through the motion detector 160, the controller 140 compares a gradient value included in the generated motion detection information with a predetermined threshold value stored in the storage 170. As a result of the comparison, if the gradient value detected through the motion detector 160 is not less than the predetermined threshold value, the controller 140 controls the proximity inputter 133 so that an extended finger hovering area returns to an initial finger hovering area. Additionally, a control command may be used to decrease the extended finger hovering area of the proximity sensor 133 to return the finger hovering area to an initial finger hovering area.

For example, the user terminal device 100 may be placed on a table in a horizontal orientation, and the display device 200 may be located within a predetermined distance with respect to the user terminal device 100. In this case, the touch inputter 131 and the proximity inputter 133 for controlling an operation of the display device 200 may be activated, and especially, the finger hovering area of the activated proximity inputter 133 may be extended. While the finger hovering area of the activated proximity inputter 133 is extended, the user may pick up the user terminal device 100 which was placed on a table in the horizontal orientation. According to an occurrence of this event, if the user terminal device 100 is moved in a vertical direction, the motion detector 160 may detect a motion of the user terminal device 100 and calculate a gradient value according to the detected motion.

The controller 140 compares the calculated gradient value and a threshold value pre-stored in the storage 170, and if the calculated gradient value is not less than the threshold value, the controller 140 controls the proximity inputter 133 to reduce the extended finger hovering area. According to the control command, the activated proximity inputter 133 may make the extended finger hovering area return to an initial finger hovering area.

The storage 170 which stores the predetermined gradient value is a storage medium configured to store various programs and the like which are required to operate the user terminal device 100, and may be a memory, a hard disk drive (HDD), or the like, as would be understood by one of skill in the art. For example, the storage 170 may include a read-only memory (ROM) for storing a program for performing an operation of the controller 140, and a random-access memory (RAM) for temporarily storing data according to an operation of the controller 140. Also, an electrically erasable and programmable ROM (EEPROM) or the like may be further included in the storage 140 to store any of various kinds of reference data.

While the touch inputter 131 and the proximity inputter 133 are activated, if it is determined, through the detector 120, that the user terminal device 100 is not within a predetermined distance with respect to the display device 200, the controller 140 controls the activated proximity inputter 133 to be deactivated. According to the control command, the previously-activated proximity inputter 133 is deactivated, so that only the touch inputter 131 is active. However, exemplary embodiments are not limited hereto, and if it is determined that the user terminal device 100 is not within the predetermined distance with respect to the display device 200, the controller 140 may control both the activated touch inputter 131 and the proximity inputter 133 to be deactivated.

According to an exemplary embodiment, if a user terminal device 100 which is not within the predetermined distance is within an extended first threshold area, the controller 140 may control only the proximity inputter 133 to be deactivated and let the touch inputter 131 remain active. Meanwhile, if the user terminal device 100 which is not within the predetermined distance is also not within the extended first threshold area, the controller 140 may control both of the touch inputter 131 and the proximity inputter 133 to be deactivated. That is, according to the distance between the user terminal device 100 and the display device 200, the controller 140 may control the operation mode of a plurality of activated inputters 130 to be deactivated by stages.

If it is detected that the user terminal device 100 is not within the predetermined distance with respect to the display device 200, the controller 140 transmits the first mode control signal, for the display device 200 to enter a power saving mode, to the display device 200 through the communicator 110. However, exemplary embodiments are not limited hereto, and as described above, the controller may transmit the first control signal to control the display device 200 to operate in the power saving mode if the user terminal device 100 is not within the predetermined distance and is also not within the extended first threshold range.

Accordingly, if the first mode control signal is received, the display device 200 may stop a display operation regarding content and perform an operation to convert to a power saving mode. While the mode of the display device 200 is in the power saving mode according to the first mode control signal, if it is detected that the user terminal device 100 exists within the predetermined distance with respect to the display device 200, the controller 140 transmits a second mode control signal, for the display device 200 to enter an active mode, to the display device 200 through the communicator 110. Accordingly, the display device 200 which was in a power saving mode may turn on its power according to the received second mode control signal and may thus enter an active mode.

If it is detected that the user terminal device 100 is within the predetermined distance with respect to the display device 200, the controller 140 provides a UI for controlling an operation of the display device 200 through the displayer 150. The UI for controlling the operation of the display device 200 may be a channel list UI, a volume list UI or the like.

If it is detected that the user terminal device 100 within the predetermined distance with respect to the display device 200, the controller 140 provides content, which is currently displayed on the display device 200, and a UI related to the corresponding content through the displayer 150. The UI related to the content may be a volume UI, a playback UI related to a high speed playback or the like.

For example, as described above, if it is detected that the user terminal device 100 is not within the predetermined distance with respect to the display device, the controller 140 transmits the first mode control signal for operating the display device 200 in the power saving mode. In the first mode, content data or content information which is currently being displayed on the display device 200 is transmitted to the user terminal device 100 before the mode of the display device 200 is converted to the power saving mode. Then, the display device 200 may stop a display operation regarding the content according to the inputted first mode control signal and may enter a power saving mode.

Accordingly, the controller 140 may perform a signal process regarding the content data received from the display device 200, or may receive the content which was being displayed on the display device 200 from a content server (not illustrated) referring to URL information included in content information. In addition, the controller 140 controls the display 150 to provide a UI related to the corresponding content. Accordingly, the display 150 may display the content which was being displayed on the display device 200 and a UI related to the corresponding content.

As described above, the user terminal device 100 may be a remote control device which controls operations of the display device 200. In this case, the controller 140, when a preset event occurs, transmits an event signal to the display device 200. Here, the preset event may be at least one of an event that a user command is input from an activated inputter out of the touch inputter 131 and the proximity inputter 133 and an event that a motion of the user terminal device 100 is sensed through the motion detector 160 according to a user manipulation.

When such event occurs, the user terminal device 100 transmits an event signal to the display device 200. After transmitting an event signal, when a brightness control signal is received from the display device 200, the controller 140 controls light emission of the rear backlit (not illustrated) included in a housing of the user terminal device 100 according to the brightness control signal received from the display device 200. In this case, the controller 140 may control the rear backlit (not illustrated) so that light can be emitted for preset threshold time.

Therefore, the light emitted through the rear backlit (not illustrated) is emitted through the button inputter 135 formed on the user terminal device 100. Accordingly, a user may easily manipulate the user terminal device 100 even in dark indoor space.

Configurations of the user terminal device 100 according to exemplary embodiments have been explained in detail. Hereinafter, configurations of the display device 200 according to exemplary embodiments will be explained in detail.

Figure 5:
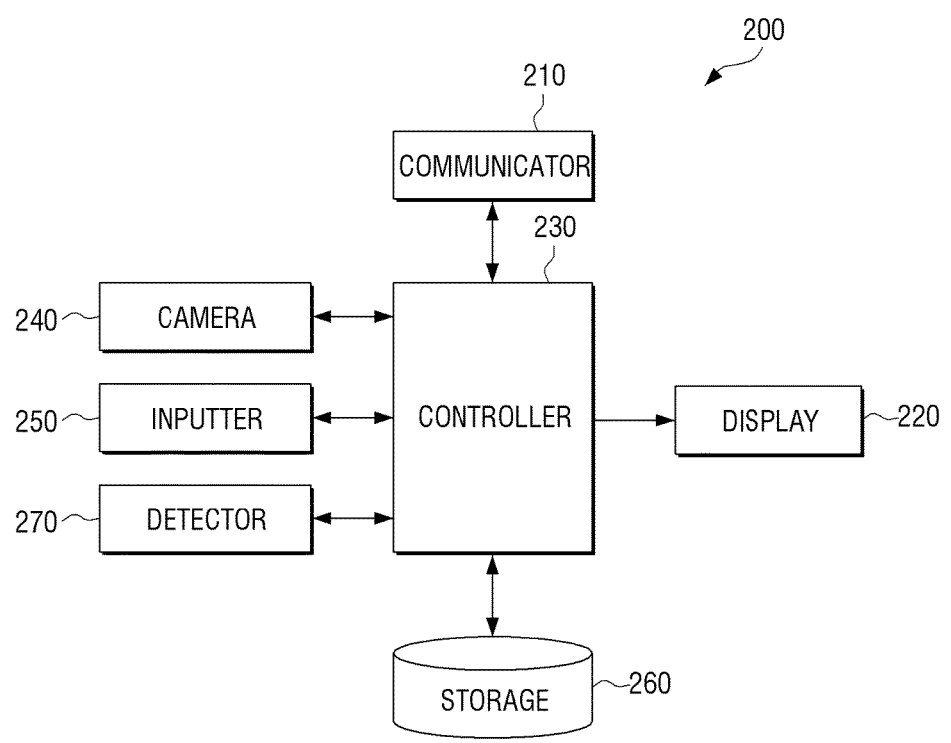
FIG. 5 is a block diagram illustrating a display device according to an exemplary embodiment.

FIG. 5 is a block diagram of a display device according to an exemplary embodiment.

As illustrated in FIG. 5, the display device 200 includes a communicator 210, a displayer 220, a controller 230, a camera 240, an inputter 250 and a storage 260.

The communicator 210 may communicate with a content server (not illustrated) wirelessly or via a wired system, providing content and receiving content which is required by a user. Also, the communicator 210 performs wireless communication with the user terminal device 100 which is paired for communication with the display device, from among a plurality of peripheral terminal devices, and which transmits at least one of content data and content information regarding content which is being displayed. If content or content information is transmitted to a user terminal device 100 which is paired with the display device 200, the communicator 210 may transmit content information to the user terminal device 100 using at least one communication method among a Bluetooth method, a BLE method, a universal plug and play (UPNP) method, a hypertext transfer protocol (HTTP) method, and a Wi-Fi method.

The display 220 displays content received from a content server (not illustrated). The display 220 may be a liquid crystal display (LCD), an organic light emitting display (OLED), a plasma display panel (PDP), or another type of display, and may include one or more display screens.

The controller 230 controls an overall operation of elements of the display device 200. Especially, the controller 230 performs an operation to covert a mode of the display device 200 to a power saving mode or an active mode based on a mode control signal received, through the communicator 210, from the user terminal device 100. To be specific, while content is being displayed on the display 220, if a first mode control signal is received from the user terminal device 100, the controller 230 transmits content data regarding corresponding content or content information regarding corresponding content to the user terminal device 100 through the communicator 210. Then, the controller 230 controls the mode of the display device 200 to enter a power saving mode in which only one or more predetermined specific elements of the display device 200 are operational. However, exemplary embodiments are not limited hereto, and the controller 230 may shut off the power to the display device 200 so that the display device 200 enters into a power-off state.

According to an additional exemplary aspect, like the user terminal device 100, the display device 200 may include a detector 270 which detects a distance to the user terminal device 100. The detector 270 may include at least one of a BLE sensor and an ultrasonic wave sensor which uses ultrasonic waves and detects a distance, a thickness, a movement and the like. Accordingly, if distance information between the display device 200 and the user terminal device 100 is acquired by the detector 270, the controller 230 transmits the distance information detected by the detector 270 to the user terminal device 100. Accordingly, the controller 140 of the user terminal device 100 may determine whether the user terminal device 100 and the display device 200 are located within the predetermined distance based on distance information received from the display device 200, and may control the touch inputter 131 and the proximity inputter 133 to be operated accordingly, as discussed above.

However, exemplary embodiments are not limited thereto, and the controller 230 may determine whether the user terminal device 100 is within the predetermined distance with respect to the display device 200 based on distance information detected by the detector 270. To be specific, if distance information between the display device 200 and the user terminal device 100 is acquired by the detector 270, the controller 230 may determine whether the user terminal device 100 is within the predetermined distance with respect to the display device 200 based on the corresponding distance information. If it is detected that the user terminal device 100 is within the predetermined distance with respect to the display device 200 through the detector 270, the controller 230 may transmit a control signal, through the communicator 201 to the user terminal device 100, to control a plurality of inputters 130 to be activated.

However, exemplary embodiments are not limited hereto, and the controller 230 may analyze an image photographed by the camera 240, and, according to whether an object corresponding to the user terminal device 100 is included in the image, may determine whether the user terminal device 100 is within the predetermined distance with respect to the display device 200. Then, the controller 230 may transmit, to the user terminal device 100, the first control signal to control all of the plurality of inputters 130 to be activated. Accordingly, the user terminal device 100 may activate the touch inputter 131 and the proximity inputter 133 according to the first control signal received from the display device 200.

While all of a plurality of inputters 130 are activated, if it is determined, via the detector or the camera 240, that the user terminal device 100 is not within the predetermined distance with respect to the display device 200, the controller 230 may transmit the second control signal, through the communicator 210, to control the activated proximity inputter 133 to be deactivated. Accordingly, the user terminal device 100 may deactivate the activated proximity inputter 133 according to the second control signal received from the display device 200.

After the second control signal is transmitted, the controller 230 may transmit at least one of content and content information, currently displayed by the display 220, to the user terminal device 100, and may control the display device 200 to enter a power saving mode.

The user terminal device 100 may display the content which was previously displayed on the display device 200, as well as a UI related to a corresponding content, based on the content or content information received from the display device 200. Accordingly, when a user who is watching content through the display device 200 moves away from the display device 200, for example into a different room, the user is able to continue to watch the content via the user terminal device 100.

Meanwhile, the aforementioned detector 270 may further include an illuminance sensor (not illustrated) which detects surround brightness. In this case, the controller 230, when an event signal is detected from the user terminal device 100 through the communicator 210, controls the detector 270 to detect brightness of surround environment through an illuminance sensor (not illustrated). Accordingly, when brightness of the surround environment is detected through the illuminance sensor (not illustrated), the controller 230 compares detected brightness information and a preset threshold value. As a result of comparison, when brightness information detected through the illuminance sensor (not illustrated) is less than or equal to a preset threshold value, the controller 230 transmits the brightness control signal to the user terminal device 100 through the communicator 210.

However, the present disclosure is not limited thereto, and the controller, in response to a control signal to control the operations of the display device 200 being received from the user terminal device 100, may compare brightness information sensed through the illuminance sensor (not illustrated) with a preset threshold value, and according to a comparison result, may transmit the brightness control signal to the user terminal device 100.

Therefore, the user terminal device 100 controls light emission of the rear backlit (not illustrated) included in a housing of the user terminal device 100 according to a brightness control signal received from the display device 200. Accordingly, light emitted through the rear backlit is emitted through the button inputter 350 formed on the user terminal device 100. Accordingly, a user can easily manipulate the user terminal device 100 even in a dark indoor space.

The inputter 250 receives a user command which is received from an input means such as an operator (not illustrated) or a touch panel (not illustrated) of the display device 200, and conveys the received user command to the controller 230. Accordingly, the controller 230 may control an operation of the display device 200 or may receive a content from a content server (not illustrated) based on a user interaction received through the inputter 250.

The storage 260 is a storage medium which stores any of various programs necessary for operating the display device 200. The storage 260 may be a memory, a hard disk drive (HDD) or the like. For example, the storage 260 may be equipped with a ROM for storing a program which performs an operation of the controller 230 and a RAM for temporarily storing data according to an operation of the controller. Further, an electrically erasable and programmable ROM (EEPROM) and the like for storing any of various kinds of reference data may be included in the storage 260.

Above, configurations of the display device 200 have been explained in detail. Hereinafter, an operation of controlling a plurality of inputters 130 of the user terminal device 100, which in turn controls an operation of the display device 200 according to a distance between the user terminal device 100, and the display device 200 will be explained in detail.

FIG. 6 is illustrates different operations according to a distance between a user terminal device and a display device according to an exemplary embodiment.

As illustrated in FIG. 6, the display device 200 is fixed in area A, and the user terminal device 100 may be in area A, where the display device 200 is fixed. In this state, a user may watch content through the display device 200 within area A where the display device 200 is fixed, and may control the display device 200 using the user terminal device 100. Herein, area A may be an area within a predetermined distance with respect to the display device 200.

As described above, if the user terminal device 100 is located in area A, the user terminal device 100 activates the touch inputter 131 and the proximity inputter 133 into which a user command for controlling an operation of the display device is inputted. Accordingly, a user may change the channel and control the volume of the display device 200 through the touch inputter 131 or the proximity inputter 133.

A user who is carrying the user terminal device 100 may deviate from area A and move to point B or point C. In this case, it is determined that the user terminal device 100 has deviated from within the predetermined distance with respect to the display device 200. Accordingly, the user terminal device 100 deactivates the previously activated proximity inputter 133. Then, the user terminal device 100 transmits a mode control signal to the display device 200 to convert the display device 200 into the power saving mode. Accordingly, the display device 200 transmits at least one of content data regarding the content which is currently displayed and content information regarding the corresponding content to the terminal device 100, and converts into a power saving mode.

The user terminal device 100 displays the content which was received form the display device 200 before converting the mode of the display device 200 to the power saving mode and displaying a UI for performing a control command regarding the corresponding content. Accordingly, when a user is watching a content through the display device 200, and deviates from area A and moves to point B or point C, the user may continue to watch the content, that was being displayed on the display device 200, using the user terminal device 100.

The user terminal device 100 according to an exemplary embodiment may perform operations sequentially according to its distance with respect to the display device 200.

According to an exemplary embodiment, when the user terminal device 100 deviates from area A and is located at point B which is within the first threshold area, the user terminal device 100 deactivates the activated proximity inputter 133. When the user terminal device 100, which has deviated from area A, is located at point C, which corresponds to an area outside of the first threshold area, the user terminal device 100 deactivates the activated proximity inputter 133. Also, the user terminal device 100 transmits, to the display device 200, the mode control signal which converts the mode of the display device 200 to a power saving mode. Accordingly, the display device 200 transmits at least one of content data of content which is currently being displayed and content information regarding the corresponding content, and converts into a power saving mode. Meanwhile, based on the content received from the display device 200 and the content information, the user terminal device 100 displays a UI for performing a control command with respect to the content which is displayed and the corresponding content before the display device 200 converts into the power saving mode.

As described above, the user terminal device 100 may deactivate a plurality of activated inputters 130 according to the user terminal's distance with respect to the display device 200.

Figure 7:
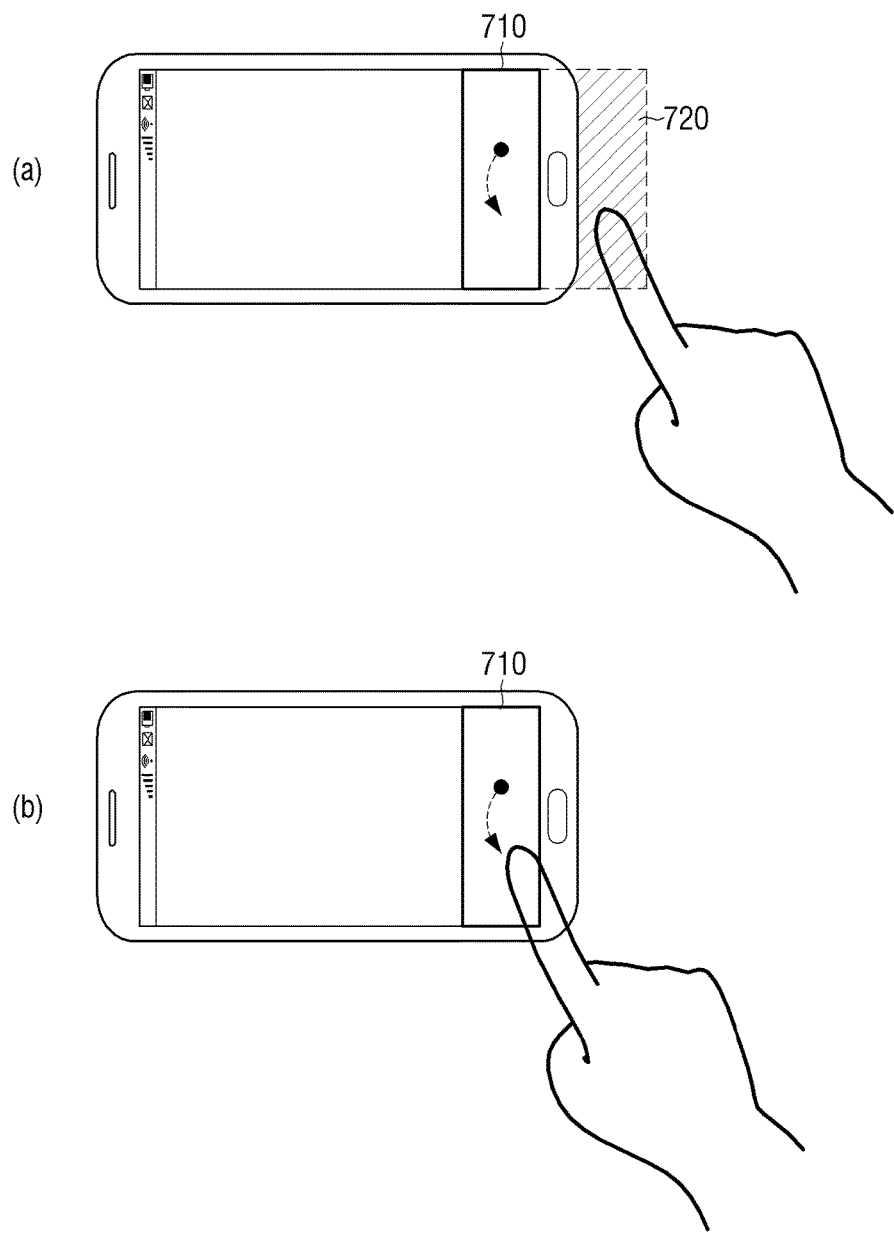
FIG. 7 is a drawing illustrating expanding a detection area of a proximity inputter of a user terminal device according to an exemplary embodiment.

FIG. 7 is a drawing illustrating extending a detecting area of a proximity inputter of a user terminal device according to an exemplary embodiment.

As illustrated in FIG. 6, the display device 200 is fixed within area A. Further, the user terminal device 100 may be in the area A in which the display device 200 is fixed. Meanwhile, a user may watch content through the display device 200 in area A where the display device is fixed, and may control the display device 200 using the user terminal device 100. Area A may be an area in which the user terminal device 100 is located within the predetermined distance with respect to the display device 200.

As described above, if the user terminal device 100 is located in area A, the user terminal device 100 activates the touch inputter 131 and the proximity inputter 133, into which a user command for controlling an operation of the display device 200 may be inputted. Herein, the user terminal device 100 controls the proximity inputter 133 to expand a finger hovering area, within which a gesture of a user who is nearby is detected. Accordingly, a finger hovering area of the proximity inputter 133 may be expanded.

To be specific, as illustrated in portion (a) of FIG. 7, a side area of the user terminal device 100 may equipped with the proximity inputter 133, and may detect whether a finger of a user is within an initially predetermined finger hovering area 710. That is, the activated proximity inputter 133 may detect whether a finger of a user is within an initial finger hovering area 710. If the user terminal device 100 is present within area A, i.e. if the user terminal device is within the predetermined distance with respect to the display device 100, the proximity inputter 133 expands the finger hovering area by a predetermined amount. Accordingly, the activated proximity inputter 133 may detect whether a finger of a user is within the initial finger hovering area or within an expanded finger hovering area 720.

A user may lift up the user terminal device 100 from a horizontal position on a table. Accordingly, if a motion is detected in which the user terminal device is moved in a vertical direction, and the detected gradient value is more than a predetermined threshold value, the user terminal device 100 may detect whether a finger of a user is within the initial finger hovering area 710. Accordingly, as illustrated in portion (b) of FIG. 7, the activated proximity inputter 133 may detect whether a user is within the initial finger hovering area 710.

Hereinafter, an operation for providing a UI according to a distance between the user terminal device 100 and the display device 200 will be explained in detail.

Figure 8:
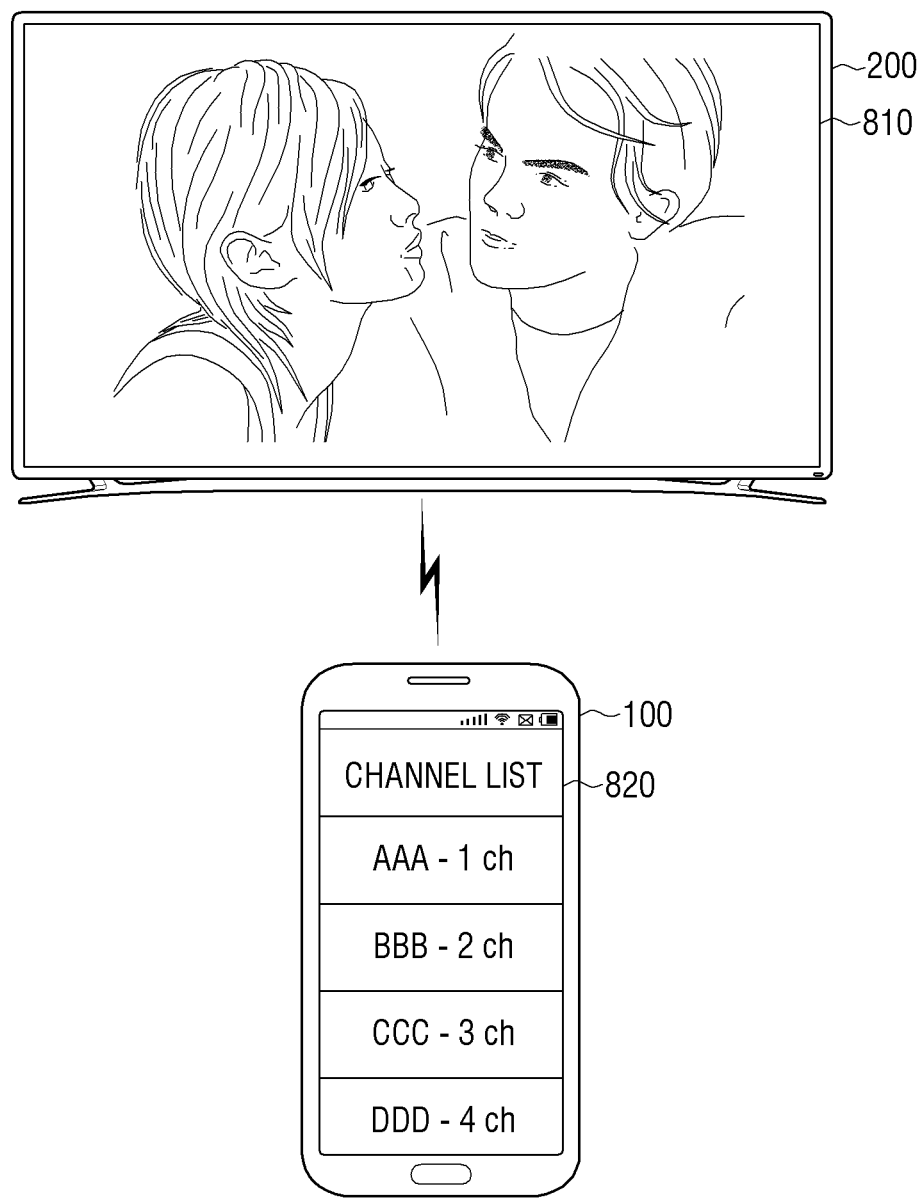
FIG. 8 is a drawing illustrating a user terminal device positioned within a predetermined distance with respect to a display device and providing a user interface (UI) according to an exemplary embodiment.
Figure 9:
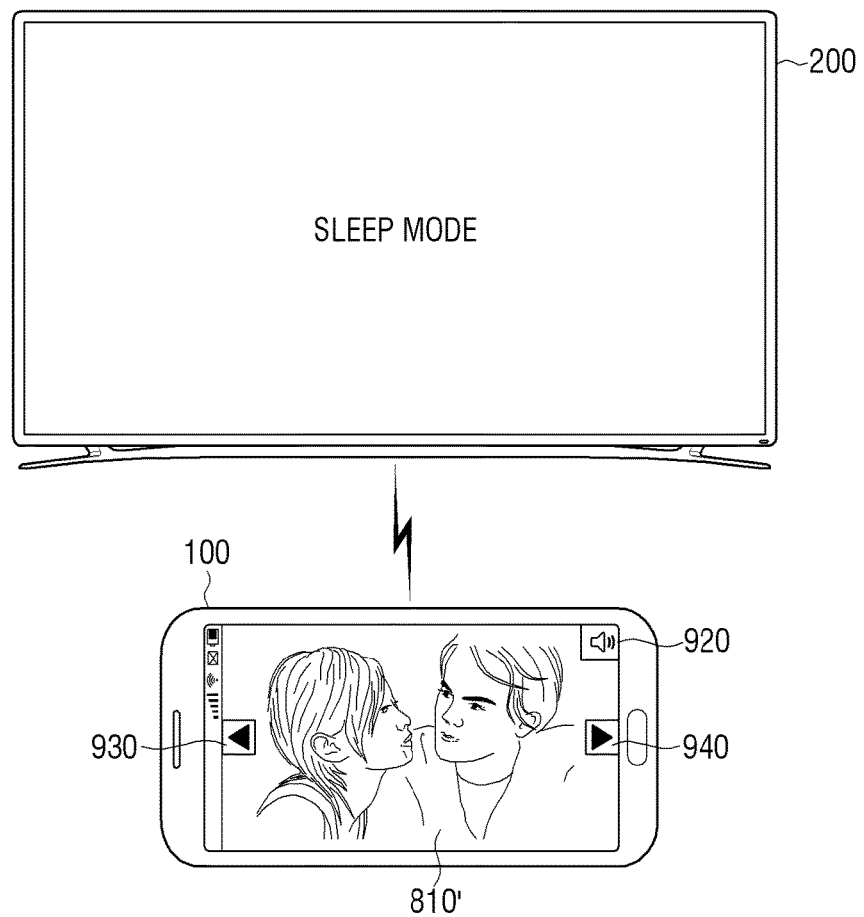
FIG. 9 is a drawing illustrating a user terminal device positioned outside a predetermined distance with respect to a display device and providing a UI according to an exemplary embodiment.

FIG. 8 is illustrates a user terminal device located within the predetermined distance with respect to a display device and providing a UI according to an exemplary embodiment. FIG. 9 illustrates a user terminal device which is outside the predetermined distance with respect to the display device and which providing a UI according to an exemplary embodiment.

As illustrated in FIG. 8, if the user terminal device 100 is located within the predetermined distance with respect to the display device 200, the user terminal device 100 displays, on a touch screen, a channel list UI 820 related to the content which is displayed on the display device 200. For example, a channel change may be performed using the user terminal device 100 while the user watches content 810 related to a drama provided by the first channel through the display device 200. That is, the user may select a channel that the user wishes to watch through the channel list UI 820 displayed on the touch screen of the user terminal device 100, and the user terminal device 100 may transmit a channel change control signal, corresponding to an inputted channel selection command, to the display device 200. Accordingly, the display device 200 may select a channel corresponding to a channel change control signal received from the user terminal device 100, may receive a broadcasting content from a corresponding channel, and may display the broadcasting content.

If the user terminal device 100 is not located within the predetermined distance with respect to the display device 200, the user terminal device 100 transmits a mode control signal to the display device 200. The display device 200 which receives the mode control signal transmits at least one of content data regarding the content which is currently displayed and content information regarding the corresponding content to the user terminal device 100. Afterward, the display device 200 stops the display operation of the content and enters into a power saving mode.

As illustrated in FIG. 9, if at least one of the content and the content information regarding the corresponding content is received by the user device from the display device 200, the user terminal device 100 may display content 810' which is displayed on a screen, based on the at least one of the received content data and content information, shortly before the display device 200 enters into the power saving mode. Also, with respect to the content 810' which is displayed on the user terminal device 100, the user terminal device 100 generates a volume UI for controlling an intensity of an audio signal of the corresponding content 810' and UIs 930, 940 for a high-speed playback and a channel conversion, and displays these UIs on a screen.

Accordingly, a user may continue to watch the content that the user was watching through the display device 200 through the user terminal device 100, and may also perform various control operations related to the corresponding content.

Figure 10:
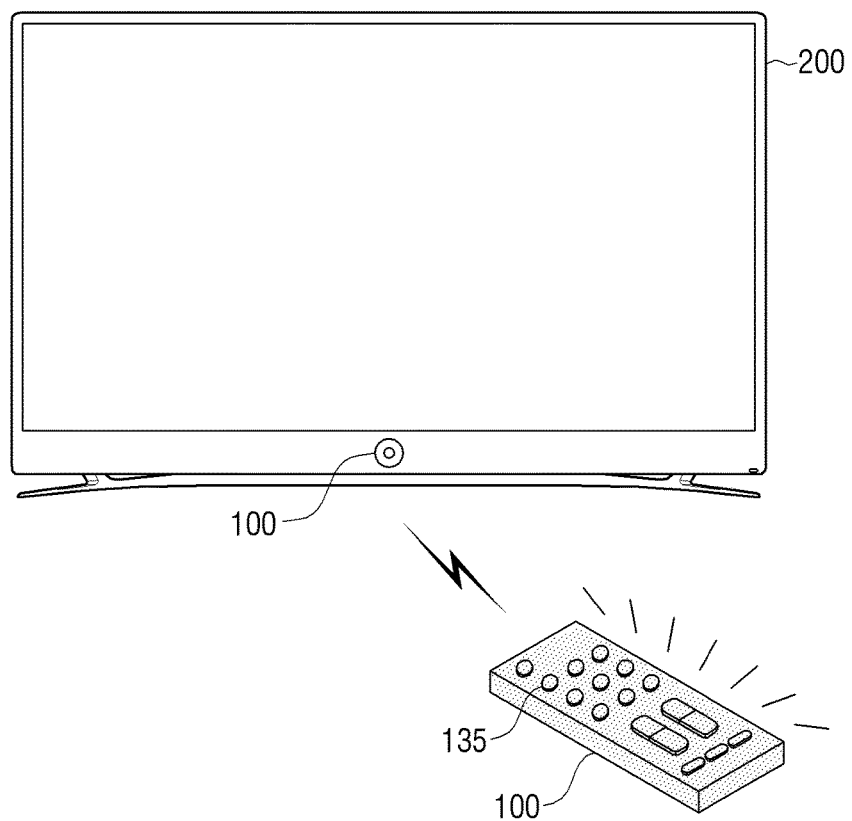
FIG. 10 is a drawing providing backlight adaptively according to surround environments from a user terminal device according to an exemplary embodiment.

FIG. 10 is a drawing providing backlight adaptively according to surrounding environment from the user terminal device according an exemplary embodiment.

As illustrated in FIG. 10, the user terminal device 100 may be a remote control device which controls the operations of the display device 200. The user terminal device 100, when a preset event occurs, transmits the event signal to the display device 200. Here, the preset event may be at least one of the event that a user command is input from the activated inputter out of the touch inputter 131 and the proximity inputter 133 and an event that a motion of the user terminal device 100 is detected according to a user manipulation through the motion detector 160.

When the event occurs, the user terminal device 100 transmits an event signal to the display device 200. When an event signal is received, the display device 200 detects surround brightness through the illuminance sensor 1010 provided on the display device 200, and compares detected brightness information with the preset threshold value. As a result, when brightness information is less than or equal to a preset threshold value, the display device 200 transmits the brightness control signal to the user terminal device 100.

However, the present disclosure is not limited thereto, and the display device 200, in response to a control signal to control the operations of the display device 200 being received, detects surround brightness through the illuminance sensor 1010 provided on the display device 200, compares the detected brightness information with a preset threshold value, and transmit a brightness control signal to the user terminal device 100 according to the comparison results.

When the brightness control signal is received, the user terminal device 100 controls light emission of the rear backlit included in a housing of the user terminal device 100 according to a brightness control signal received from the display device 200. In this case, the user terminal device 100 may control the rear backlit so that light is emitted for preset threshold time.

Accordingly, light emitted through the rear backlit is emitted through the button inputter 135 formed on the user terminal device 100. Accordingly, a user can easily manipulate the user terminal device 100 even in a dark indoor space.

Hereinafter, a method for controlling the user terminal device 100 will be explained in detail.

Figure 11:
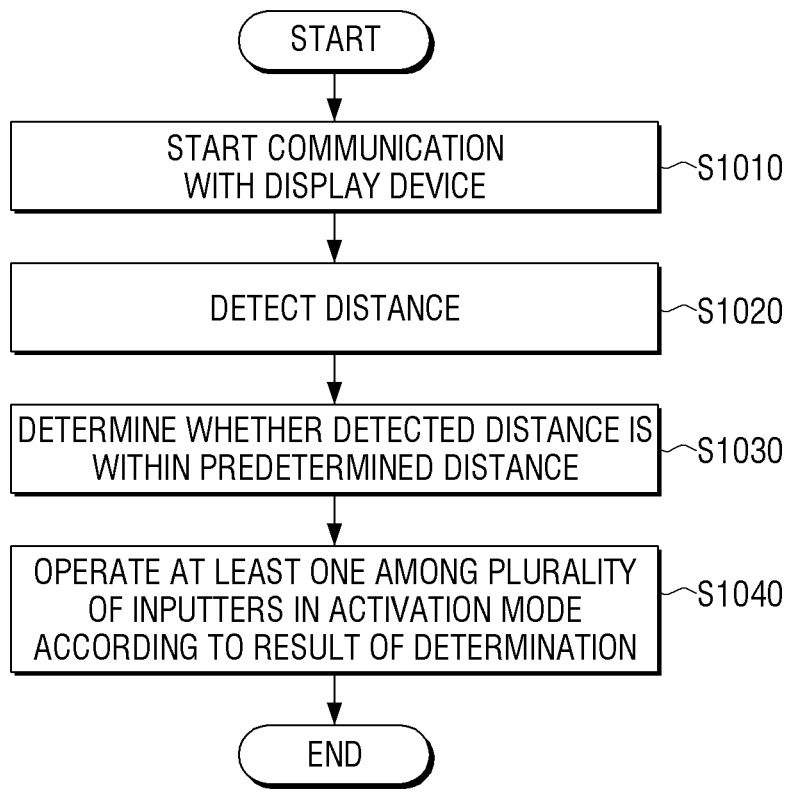
FIG. 11 is a flowchart illustrating a method for controlling a user terminal device according to an exemplary embodiment.

FIG. 11 is a flowchart illustrating a method for controlling a user terminal device according to an exemplary embodiment. As illustrated in FIG. 11, the user terminal device 100 starts a communication with the display device 200 (S1010). If the user terminal device 100 is paired with the display device 200 and starts a communication, the user terminal device 100 periodically detects a distance to the display device 200 (S1020). According to an exemplary embodiment, the user terminal device 100 may detect a distance between the user terminal device 100 and the display device 200 using at least one of a BLE and an ultrasonic wave sensor. However, exemplary embodiments are not limited hereto, and the user terminal device 100 may receive detected distance information through another type of sensor equipped within the display device 200. If the information regarding the distance between the user terminal device 100 and the display device 200 is detected or the distance information is received, the user terminal device 100 determines whether the user terminal device 100 is within the predetermined distance with respect to the display device 200, based on the corresponding distance information, and controls at least one of a plurality of inputters to be activated according to a result of the determination (S1030, S1040).

Herein, the plurality of inputters are configured for receiving a control command for controlling an operation of the display device 200 and a user command for controlling an operation of a user terminal device 100. the plurality of inputters may include a touch inputter and a proximity inputter. The touch inputter may be a touch sensor in which a touch command of a user is received on a touch screen, and a proximity inputter may be a proximity sensor in which a user command corresponding to a detected result is received by detecting a gesture of a user who is nearby.

Meanwhile, if the user terminal device 100 is a remote controller which controls the operations of the display device 200, the user terminal device 100, when a preset event occurs, transmits an event signal to the display device 200. Here, the preset event may be at least one of an event that a user command is input from the activated inputter out of the touch inputter and the proximity inputter and an event that a motion of the user terminal device 100 is detected.

When the event occurs, the user terminal device 100 transmits an event signal to the display device 200. After transmitting an event signal, when the brightness control signal is received from the display device 200, the user terminal device 100 operates the rear backlit to be in an active mode so that light is emitted in the rear backlit (not illustrated) included in a housing of the user terminal device 100 through the aforementioned S1040.

Therefore, the user terminal device 100 penetrates light emitted from the rear backlit (not illustrated) changed to an active mode through the button inputter 135. Accordingly, a user may easily manipulate the user terminal device 100 even in a dark indoor space.

Hereinafter, a method for operating at least one of the plurality of inputters in an active mode, according to whether the user terminal device 100 is within the predetermined distance with respect to the display device 200, will be explained in detail.

Figure 12:
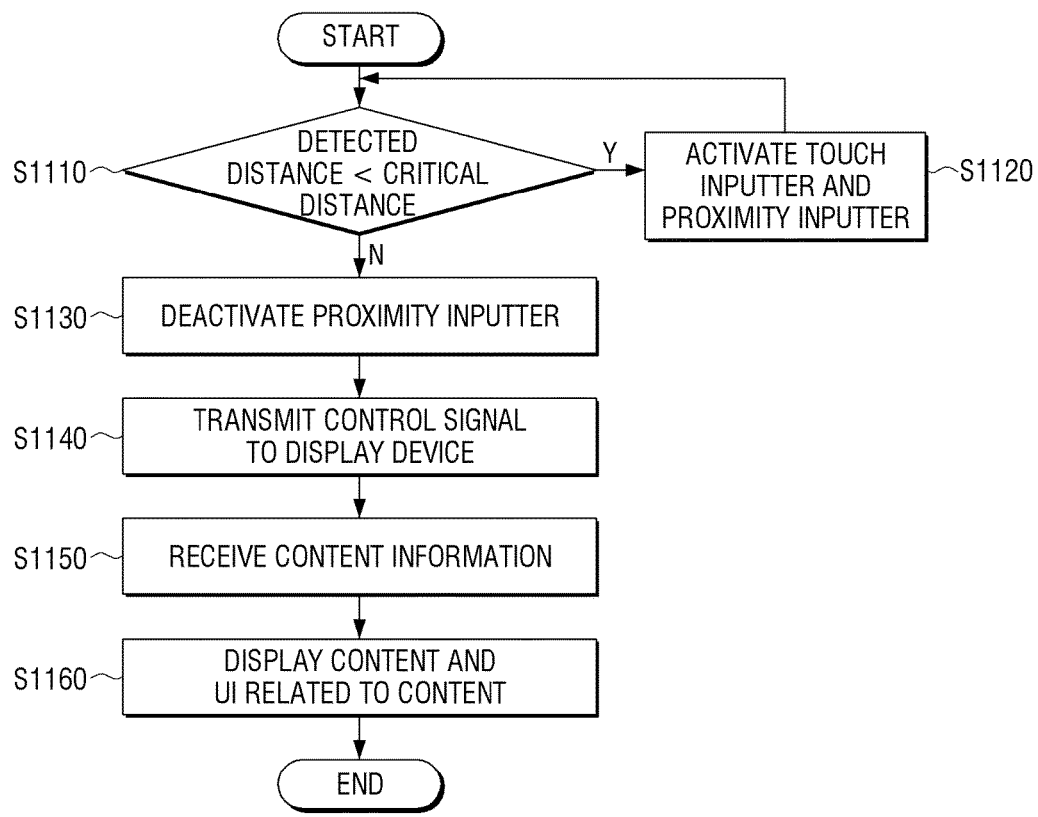
FIG. 12 is a flowchart illustrating a method for displaying a plurality of inputters and a UI according to a distance between a user terminal device and a display device according to an exemplary embodiment.

FIG. 12 is a flowchart illustrating a method for operating a plurality of inputters and a UI according to the distance between the user terminal device 100 and the display device 200 according to an exemplary embodiment.

As illustrated in FIG. 12, the user terminal device 100 may periodically detect a distance to the display device 200 using the detector and may acquire distance information, and may receive detected distance information from the display device 200. If the distance information is received, the user terminal device 100 determines whether the user terminal device 100 is within the predetermined threshold distance with respect to the display device 200 based on the received distance information (S1110).

As a result of the determination, if the distance between the user terminal device 100 and the display device 200 is less than the predetermined threshold distance, the user terminal device 100 activates both of the touch inputter and the proximity inputter (S1120). If the touch inputter and the proximity inputter are activated, the user terminal device 100 expands the finger hovering area of the activated proximity inputter. Herein, the finger hovering area may be a detecting area for detecting a gesture of a user who is close to the proximity inputter.

If a gradient value is detected, according to a motion detection of the user terminal device 100, while the finger hovering area of the activated proximity inputter is expanded, the user terminal device 100 compares the detected gradient value and a predetermined threshold value. As a result of the comparison, if the gradient value is not less than the predetermined threshold value, the user terminal device 100 may return the expanded finger hovering area to an initial finger hovering area.

If it is detected that the user terminal device 100 is not within the predetermined distance with respect to the display device 200, while the touch inputter and the proximity inputter are activated, the user terminal device 100 deactivates the proximity inputter (S1130). Afterward, the user terminal device 100 transmits a control signal, to the display device, for operating in a power saving mode. That is, if it is detected that the user terminal device is not within the predetermined distance with respect to the display device 200, the user terminal device deactivates the proximity inputter, and then transmits the first mode control signal to the display device 200. Accordingly, if the first mode control signal is received, the display device 200 may stop a display operation of the content and enter into a power saving mode.

While a mode of the display device 200 is in power saving mode according to the first mode control signal, if it is detected that the user terminal device 100 is within the predetermined distance with respect to the display device 200, the user terminal device 100 transmits the second mode control signal to the display device 200 to activate the display device 200. Accordingly, the display device 200 in a power saving mode may perform an operation of turning on the power and then operate in an active mode according to the received second mode control signal.

Before entering a power saving mode, the display device 200, which received the first mode control signal, transmits, to the user terminal device 100, at least one of content data regarding the content which is displayed on the display device 200 and content information regarding the corresponding content. Accordingly, if the information related to the content is received from the display device 200, the user terminal device 100 displays the content, which was displayed on the display device 200 shortly before entering into a power saving mode, and a UI related to the corresponding content based on the information related to the received content (S1150, S1160).

If the user terminal device 100 which displays the content which is currently displayed on the display device 200 and a UI related to the corresponding content is within the predetermined distance with respect to the display device, a UI for controlling an operation of the display device 200 may be displayed on a touch screen.

Exemplary embodiments are illustrated and explained above, but should not be considered to be limiting. The description of the embodiments is intended to be illustrative, and not to limit the scope of the claims, and it would be appreciated by those skilled in the art that changes may be made to the embodiments without departing from the principles and spirit of the invention, the scope of which is defined in the appended claims.

What is claimed is:

1. A display device, comprising:
a display;
a communicator;
a sensor configured to sense a distance between a user terminal device and the display device; and
a processor configured to:
control the display to display a content; and
in response to the distance between the user terminal device and the display device not being within a predetermined distance, control the communicator to transmit, to the user terminal device, information on the content being displayed on the display and then turn off the display.

2. The display device as claimed in claim 1, wherein the information on content transmitted to the user terminal device is information for use in the user terminal device to continuously provide the content being displayed on the display and provide a user interface corresponding to the content.

3. The display device as claimed in claim 1, wherein the processor is further configured to, in response to the distance between the user terminal device and the display device being within the predetermined distance while the display is turned off, turn on the display.

4. The display device as claimed in claim 1, wherein the processor is further configured to, in response to the distance between the user terminal device and the display device being within the predetermined distance, control the communicator to transmit a signal to control the user terminal device to activate at least one of a plurality of inputters of the user terminal device that is deactivated.

5. The display device as claimed in claim 1, wherein the sensor comprises at least one of a Bluetooth low energy sensor and an ultrasonic wave sensor.

6. A display device, comprising:
a display;
a communicator;
a sensor configured to sense a distance between a user terminal device and the display device;
an illuminance sensor; and
a processor configured to:
in response to the distance between the user terminal device and the display device not being within a predetermined distance, turn off the display;
identify ambient illuminance based on a sensing value sensed from the illuminance sensor; and
control the communicator to transmit a control signal for controlling a brightness of a button of the user terminal device based on the identified ambient illuminance.

7. The display device as claimed in claim 6, wherein the processor is further configured to, in response to the identified ambient illuminance being less than or equal to a preset threshold value, control the communicator to transmit the control signal for controlling the brightness of the button of the user terminal device.

8. The display device as claimed in claim 6, wherein the processor is further configured to, in response to an event signal generated according to an occurrence of a predetermined event being received from the user terminal device through the communicator, control the illuminance sensor to perform a sensing operation on the ambient illuminance.

9. The display device as claimed in claim 8, wherein the event signal is generated according to at least one of an event in which a user command is input through the user terminal device and an event in which a motion of the user terminal device is detected.

10. The display device as claimed in claim 6, wherein the control signal is a signal for controlling light emission of a backlit disposed on back surface of the button of the user terminal device.

11. A method for controlling a display device, the method comprising:

sensing a distance between a user terminal device and the display device; and in response to the distance between the user terminal device and the display device not being within a predetermined distance, transmitting, to the user terminal device, information on content being displayed through the display and then turning off a display of the display device.

12. The method as claimed in claim 11, wherein the information on content transmitted to the user terminal device is information for use in the user terminal device to continuously provide the content being displayed on the display and provide a user interface corresponding to the content.

13. The method as claimed in claim 11, further comprising:

in response to the distance between the user terminal device and the display device being within the predetermined distance while the display is turned off, turning on the display.

14. The method as claimed in claim 11, further comprising:

in response to the distance between the user terminal device and the display device being within the predetermined distance, transmitting a signal to control the user terminal device to activate at least one of a plurality of inputters of the user terminal device that is deactivated.

15. A method for controlling a display device, the method comprising:

sensing a distance between a user terminal device and the display device;

in response to the distance between the user terminal device and the display device not being within a predetermined distance, turning off a display of the display device;

identifying ambient illuminance based on a sensing value sensed from an illuminance sensor of the display device; and transmitting a control signal for controlling a brightness of a button of the user terminal device based on the identified ambient illuminance.

16. The method as claimed in claim 15, wherein the transmitting comprises, in response to the identified ambient illuminance being less than or equal to a preset threshold value, transmitting the control signal for controlling the brightness of the button of the user terminal device.

17. The method as claimed in claim 15, further comprising:

in response to an event signal generated according to an occurrence of a predetermined event being received from the user terminal device, controlling the illuminance sensor to perform a sensing operation on the ambient illuminance.

18. The method as claimed in claim 17, wherein the event signal is generated according to at least one of an event in which a user command is input through the user terminal device and an event in which a motion of the user terminal device is detected.

* * * * *